United States Patent [19]

Kohonen

[11] 4,354,934

[45] Oct. 19, 1982

[54] FILTER PRESS

[75] Inventor: Raimo Kohonen, Savonlinna, Finland

[73] Assignee: Enso-Gutzeit Osakeyhtio, Helsinki, Finland

[21] Appl. No.: 247,749

[22] Filed: Mar. 26, 1981

[51] Int. Cl.[3] .............................................. B01D 33/04

[52] U.S. Cl. .................................... 210/386; 210/401; 100/118; 162/273

[58] Field of Search ................ 162/273, 274; 210/386, 210/232, 400, 401; 474/101, 144; 100/118

[56] References Cited

U.S. PATENT DOCUMENTS

| | | | |
|---|---|---|---|
| 2,981,653 | 4/1961 | Beachler | 162/273 |
| 3,129,135 | 4/1964 | Hombostel et al. | 162/273 |
| 3,994,774 | 11/1976 | Halme et al. | 162/273 |
| 4,138,316 | 2/1979 | Kessler | 162/273 |
| 4,140,575 | 2/1979 | Wonzi | 162/273 |
| 4,147,101 | 4/1979 | Heissenberger | 210/386 |
| 4,200,490 | 4/1980 | O'Hogan | 162/273 |
| 4,220,501 | 9/1980 | Skaugen | 162/273 |

*Primary Examiner*—Thomas G. Wyse

*Attorney, Agent, or Firm*—Toren, McGeady & Stanger

[57] ABSTRACT

Filter press for separating the liquid from the silt of sludge by using running filter strips guided by rollers journalled in bearings in the girder frame of the filter press. One side section of the frame is equipped with removable frame sections for the purpose of exchanging the filter strips and the opposite side section of the frame has been equipped with pull rods, supporting the frame during the exchange of the filter strips. The lower ends of the pull rods are secured to the ends of telescopic support extensions, extentable sideways from the lower part of the frame and the upper pull rod ends are attached to the upper section of the frame.

1 Claim, 3 Drawing Figures

FILTER PRESS

This invention concerns a filter press for separating the liquid from the silt by using endless filter strips guided by rollers journalled in bearings at the girder frame, the one side of which is equipped with removable frame parts for the purpose of exchanging the filter strips and the other side of which is equipped with pull rods supporting the frame during the exchange of filter strips.

By known filter presses using endless filter strips the exchange of strips is made by using a lifting device, which is placed above the press when the top part of the press is removed. A disadvantage is that a lifting device is not present for, and its purchase solely fon the exchange of filter strips is expensive.

The purpose of the invention is to make the exchange of endless filter strips easier and more rapid and to arrange the exchange in a new mode. The filter press according to this invention is characterized in that the bottom ends of the pull rods are situated at the support extensions, which extend sideways from the lower part of the frame, and the upper ends are attached to the upper part of the frame. This provides a stable frame unit eliminating the need for special supporting points.

An advantageous construction for the invention is characterized in that the support extensions are telescopically extendable. For the purpose of exchanging the filter strips the support extensions are to be pulled out to support the upper part of the frame, using the pull rods, and when not in use the support extensions are pushed into the lower part of the frame.

The weight of the filter press is low, allowing the use of tilted pull rods of moderate thickness. The tilted installation of the pull rods will not prevent locating the press alongside a wall, as will the use of horizontal pull rods. The filter press may be located at any chosen position, without the pull rod arrangement limiting the mounting.

The invention is described below by example referring to the attached drawings, showing:

Figure 1:
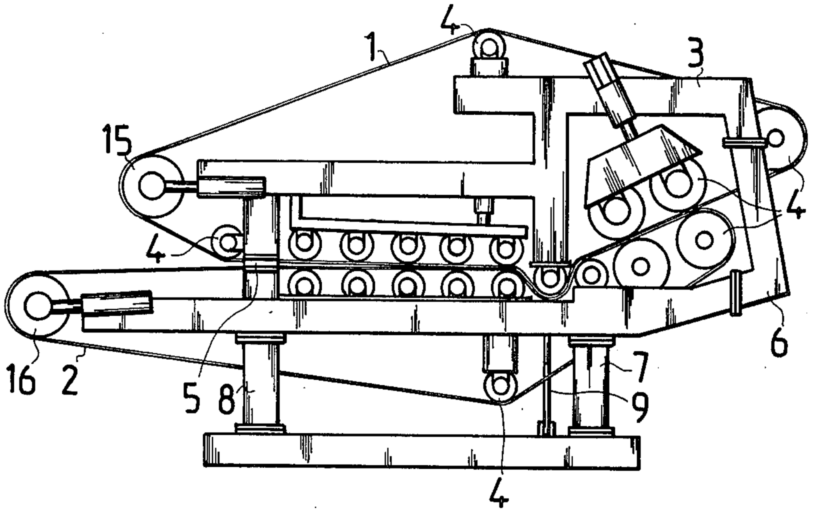
FIG. 1 is a side view of the filter press.
Figure 2:
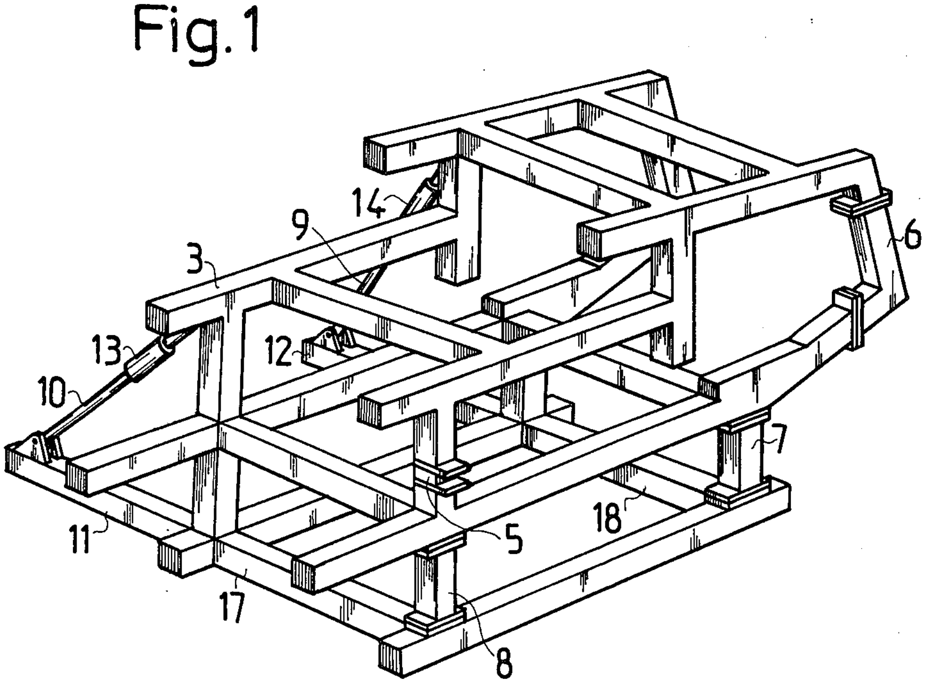
FIG. 2 is a perspective view of the filter press viewed from above.
Figure 3:
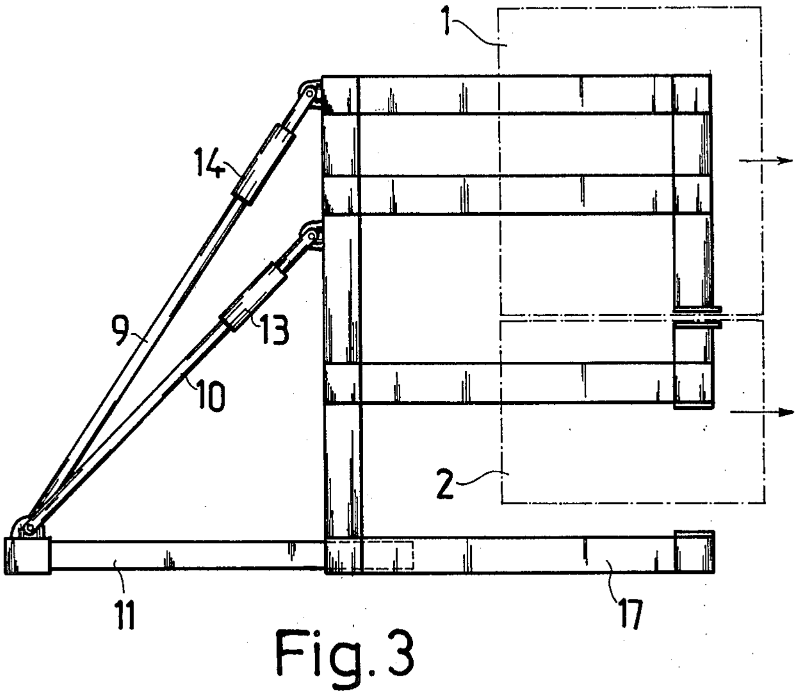
FIG. 3 is an end view of the frame.

The filter press is equipped with two endless filter strips, the upper strip 1 and the lower strip 2. The running of the filter strips 1, 2 is guided by the rollers 4, 15, 16, journalled in bearings is an end the filter press frame 3. The right hand side section of the frame 3 according to FIGS. 2 and 3 is equipped with removable frame sections 5, 6, 7, 8 for the exchange of the filter strips 1, 2. On the opposite side of the frame 3 the supporting pull rods 9, 10 are located during the exchange of the filter strips 1, 2. The removable sections consist of the two base supports 7, 8 of the frames 3 and of the upper frame support columns 5, 6, one of which is very short, serving as an intermediate section 5 a few centimeter in length.

The lower ends of the pull rods 9, 10 are attached to the ends of the support extensions 11, 12, which extend sideways from the lower part of the frame 3, the upper ends being attached to the upper part of the frame. The pull rods 9, 10 are equipped with rigging screws 13, 14 for stretching. The support extensions 11, 12 are telescopically extendable.

The exchange of filter strips is done according to the following procedure: The tension rollers 15, 16 are set at minimum distance, slacking the filter strips 1, 2. The support extensions 11, 12 are pulled out of and secured to the cross bars 17, 18 situated in the lower part of the frame 3. The pull rods are fastened and by stretching the rigging screws 13, 14 the upper part of the frame 3 is supported by the pull rods. The removable sections 5, 6, 7, 8 are removed as well as other frame parts obstructing the removal of the filter strips. The filter strips 1, 2 may now be removed sideways from the filter press according to FIG. 3. New filter strips are inserted and the frame sections 5, 6, 7, 8 are fastened to the frame 3, the pull rods 9, 10 are loosened by means of the rigging screws 13, 14, the support extensions 11, 12 are disengaged and pushed telescopically into the cross bars 17, 18. The filter strips 1, 2 are stretched into working positioned by means of the stretch rollers 15, 16 and then are ready for use. It is obvious for the branch professional that the constructional details of the invention may be varied within the scope of the patent claims. Thus the technical constructions of the example is not limited to the type of filter press shown in the drawings, but may be modified within the patent claims. The lower ends of the pull rods 9, 10 may be attached, instead of, to the support extensions of the frame directly to the ground or to a wall near the machine. The drawing shows two pull rods 9, 10, but in some constructions only one pull rod may be required. There may also be used more than two pull rods.

I claim:

1. Improvements in a filter press for separating the liquid from the slit in a sludge comprising a girder frame having a pair of opposite sides and a pair of opposite ends extending transversely of said opposite sides, rollers extending between said opposite sides, bearings in said girder frame with said rollers journalled in said bearings, endless filter strips fitted over said rollers and extending in the direction between the opposite ends of said girder frame, removable frame sections located in one of said opposite sides so that with said frame sections removed said filter strips can be removed from said rollers and out of said girder frame, pull rods secured to the other one of said opposite sides for supporting said girder frame during the removal of said filter strips when said removable frame sections are removed from said girder frame, each of said opposite sides having an upper part and a lower part, each of said pull rods having a first end and a second end with said first ends secured to said upper part of the other one of said opposite sides, a support extension corresponding to each said pull rod telescopically mounted in the lower part of said girder frame and movable telescopically outwardly and inwardly relative to the other one of said opposite sides so that said support extensions can be extended outwardly transversely of the direction of said filter strips, the second ends of said pull rods secured to said support extensions outwardly from the other one of said opposite sides, and rigging screws in said pull rods intermediate the first and second ends thereof for adjusting said pull rods when said supports extensions are extended so that said pull rods are secured for supporting said girder frame when said filter strips are being exchanged.

* * * * *